(12) United States Patent
Franke

(10) Patent No.: US 6,945,209 B2
(45) Date of Patent: Sep. 20, 2005

(54) TORSIONAL VIBRATION DAMPER

(75) Inventor: Jens Erik Franke, Gifhorn (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/489,396

(22) PCT Filed: Sep. 6, 2002

(86) PCT No.: PCT/EP02/09987
§ 371 (c)(1),
(2), (4) Date: Apr. 26, 2004

(87) PCT Pub. No.: WO03/023253

PCT Pub. Date: Mar. 20, 2003

(65) Prior Publication Data
US 2005/0022774 A1 Feb. 3, 2005

(30) Foreign Application Priority Data

Sep. 11, 2001 (DE) .......................................... 101 44 682

(51) Int. Cl.[7] .............................................. F02B 75/06
(52) U.S. Cl. ..................................... 123/192.1; 74/604
(58) Field of Search .......................... 123/192.1; 74/604

(56) References Cited

U.S. PATENT DOCUMENTS 2,411,000 A * 11/1946 Rockwell ..................... 74/604
2,573,398 A   10/1951 Butenkoff
4,422,347 A   12/1983 Conseur

FOREIGN PATENT DOCUMENTS

| DE | 19 67 944    | 9/1967  |
| DE | 1 526 475    | 4/1970  |
| DE | 28 18 295 A1 | 10/1979 |
| DE | 29 12 090 A1 | 10/1980 |
| DE | 37 29 975 A1 | 3/1989  |
| EP | 1 028 269 A1 | 8/2000  |
| EP | 1 092 501 A2 | 4/2001  |
| FR | 1374234      | 11/1963 |
| GB | 1239450      | 7/1971  |

* cited by examiner

Primary Examiner—Noah P. Kamen
(74) Attorney, Agent, or Firm—Ostrolenk, Faber, Gerb & Soffen, LLP; Klaus P. Stoffel

(57) ABSTRACT

A torsional vibration damper for the crankshaft of an internal combustion engine. The damper includes a housing and a damper mass arranged in the housing and embedded in a fluid. The damper mass is joined to the housing by a spring device. The spring device is embodied and arranged in such a way that the damper mass is prevented from knocking against the housing.

5 Claims, 3 Drawing Sheets

TORSIONAL VIBRATION DAMPER

PRIORITY CLAIM

This is a 35 U.S.C. §371 National Stage of International Application No. PCT/EP2002/09987, filed on Sep. 6, 2002. Priority is claimed on that application and on the following application:

Country: Germany, Application No.: 101 44 682.9, filed Sep. 11, 2001.

BACKGROUND OF THE INVENTION

The invention pertains to a torsional vibration damper for the crankshaft of an internal combustion engine, the damper comprising a housing and a damper mass, which is installed in the housing and embedded in a fluid, where the damper mass is connected to the housing by a spring device with leaf springs.

A torsional vibration damper of the general type in question is known from EP 1 028 269 A1, in which a hub, designed as a torsion spring, is connected nonrotatably to the crankshaft in the axial area of one of the cranks of the crankshaft. The damper masses are connected to the hub a certain axial distance away from a connecting rod by means of balance-beam-like arms. A housing creates a space, which holds a fluid of a viscosity appropriate for damping vibrations.

A torsional vibration damper is known from DE 19 67 944, in which a secondary balance weight is guided rotatably inside a housing. The balance weight consists of a radially outer partial ring with radial locating holes, in which spring rods are supported. The outer partial ring is connected nonrotatably to a concentric, inner partial ring. The spring rods extend from the outer partial ring through the inner partial ring and into a drive component.

A viscohydraulic torsional vibration damper with leaf spring-supported balance ring is known from the document DE 28 18 295 A. The leaf springs are connected at opposite ends to a balance ring 1, and their middle sections are tightly clamped in housing slots, which cross each other at right angles.

SUMMARY OF THE INVENTION

The invention is based on the task of simplifying a torsional vibration damper of the type indicated above with respect to its design while simultaneously improving its performance.

For this purposes, according to the invention, a torsional vibration damper is provided that has at least two leaf springs that are connected by one end to the housing and by the opposite end to the damper mass. The leaf springs are arranged in such a way that they exert a restoring force on the damper mass both against a centrifugal force acting on the damper mass and against a deflection of the damper mass in the circumferential direction, so that the damper mass is prevented from striking the housing.

This has the advantage that the loss of damping action caused by contact between the damper mass and the housing is effectively avoided under all possible operation conditions.

A high level of integration into the crankshaft requiring only a small amount of space is achieved by designing the housing as a part of a counterweight and/or of a crank arm of one of the cranks of the crankshaft.

An especially simple design and ease of assembly are achieved by designing the damper mass as a single part.

In a preferred embodiment, the damper mass has a groove for each leaf spring, and the section of the leaf spring between its two ends fits into this groove. Each of the leaf springs has a thickened, cylindrical area at each end. These cylindrical ends fit into corresponding cylindrical openings in the housing and in the damper mass.

Additional features, advantages, and advantageous elaborations of the invention can be derived from the dependent claims and from the following description of the invention, which is based on the attached drawing:

DETAILED DESCRIPTION OF THE INVENTION

Figure 1:
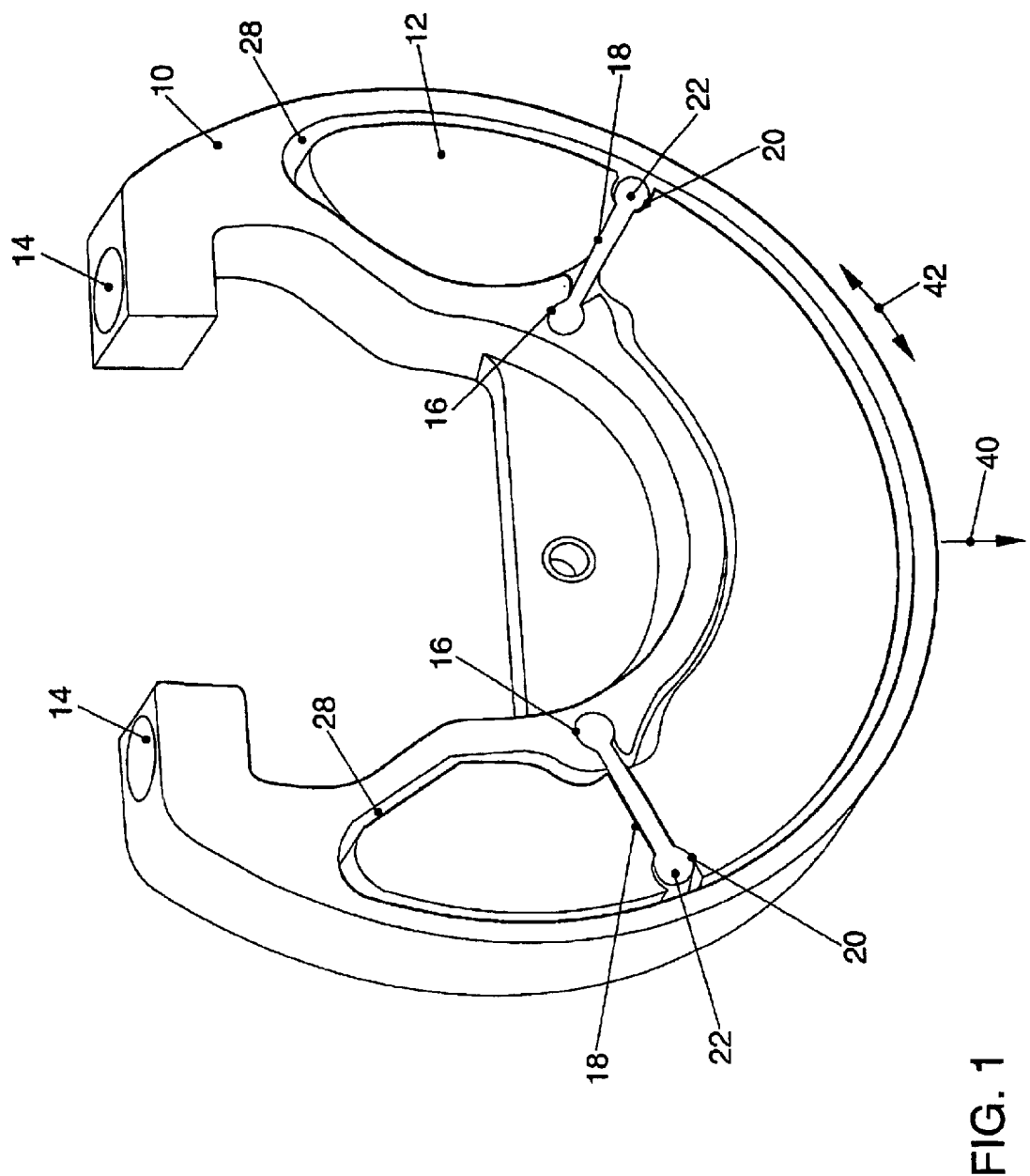
FIG. 1 shows a perspective view of a preferred embodiment of an inventive torsional vibration damper in a partially assembled state.

The preferred embodiment of an inventive torsional vibration damper shown in FIG. 1 comprises a housing 10, in which a damping mass 12 installed. The housing 10 is designed as part of a crank arm of a crankshaft (not shown) and is simultaneously part of a balance weight for a corresponding crank drive. The holes 14 are used to attach the housing 10 to the crankshaft in the area of a crank arm.

Figure 2:
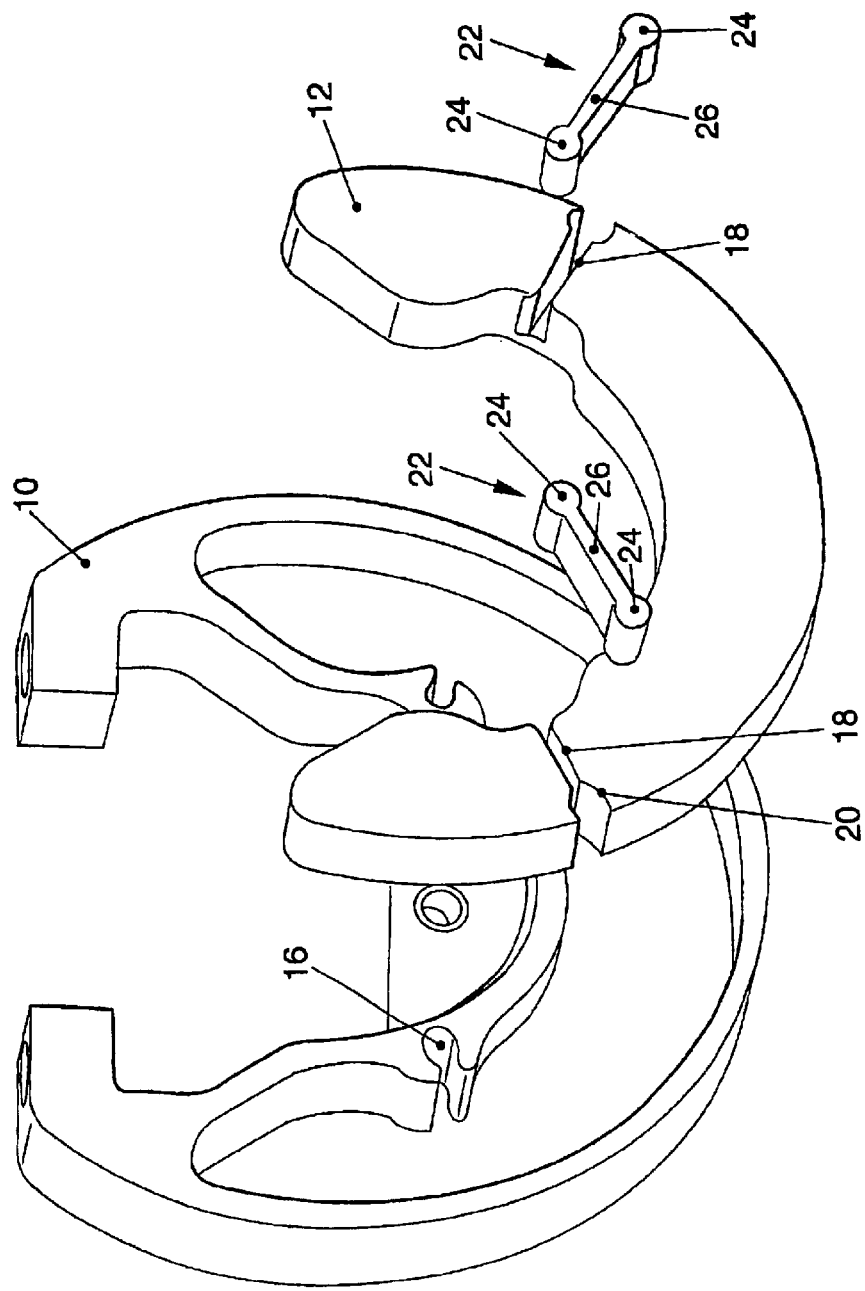
FIG. 2 shows an exploded view of the torsional vibration damper according to FIG. 1.

As can be seen in FIG. 2, the housing 10 has two first cylindrical openings 16. The damping mass 12 is designed with two elongated openings 18 and second cylindrical openings 20, which belong to the elongated openings. The openings 16, 18, 20 are arranged and designed in such a way that, after the damping mass 12 has been placed in the housing 10, the elongated openings 18 of the damping mass 12 align with the assigned first cylindrical openings 16 in the housing 10, the first and second cylindrical openings 16, 20 being located on opposite sides of the damping mass 12. These openings 16, 18, 20 form a space with a dumbbell-shaped cross section, into which a correspondingly designed leaf spring 22 is inserted. The leaf springs 22 are therefore designed with thickened cylindrical areas 24 at their ends, which conform to the shape of the openings 16, and 20. These cylindrical ends are connected to each other by the flat, central section 26 of the leaf spring 22.

The leaf springs 22 are inserted into the space formed by the openings 16, 18, 20 and thus connect the damping mass 12 elastically to the housing 10. The leaf springs 22 exert a restoring force on the damping mass 12 in the circumferential direction 42 (FIG. 1), that is, in the direction of rotation and in the opposite direction, so that a corresponding damping action is obtained. In addition, the leaf springs 22 exert a restoring effect against a centrifugal force 40 acting on the damping mass 12 (FIG. 1), so that the damping mass 12 is prevented from making radial contact with the housing 10. The movement of the damping mass 12 in the housing 10 is damped by a fluid of suitable viscosity, such as silicone oil, which is provided in the intermediate space 28 between the housing 10 and the damping mass 12. The space in the housing 10 which contains the damping mass 12 and the damping fluid is closed by a cover (not shown in FIGS. 1 and 2).

Figure 3:
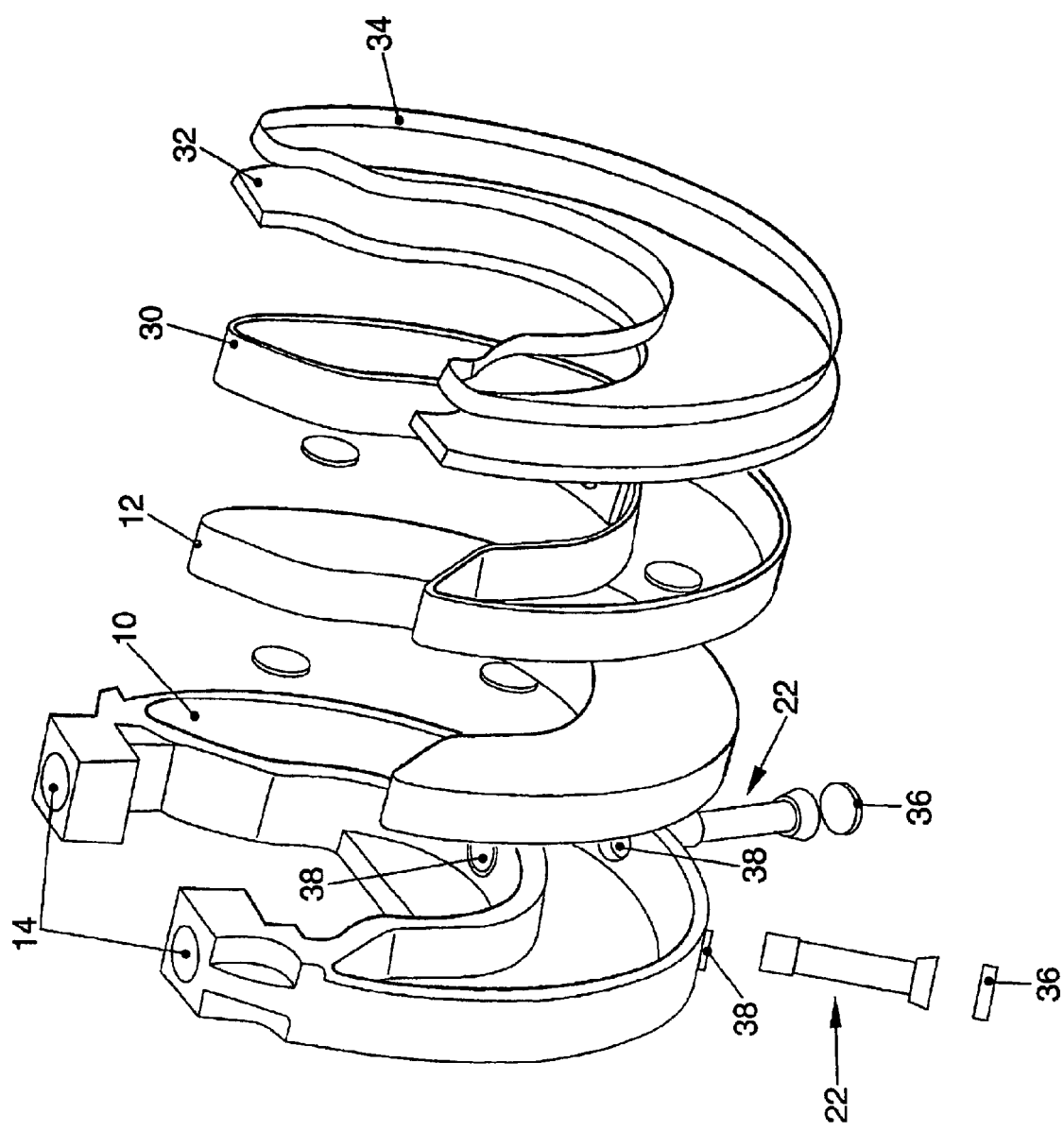
FIG. 3 shows an exploded view of a second preferred embodiment of an inventive torsional vibration damper.

FIG. 3 shows a second preferred embodiment of an inventive torsional vibration damper. This exploded diagram explains how the torsional vibration damper is assembled. In addition to the parts previously discussed in connection with FIGS. 1 and 2, namely, the housing 10, the damping mass 12, and the leaf springs 22, the torsional vibration damper also comprises the damping fluid 30, the cover 32, and a weld 34, by means of which the cover 30 is attached to the housing 10. In contrast to the design shown in FIGS. 1 and 2, the alternative embodiment according to FIG. 3 has radial bores 38 for the insertion of the leaf springs 22, these bores being formed in the damping mass 12 and in the housing 10; only the bores 38 in the housing 10 are visible in FIG. 3. After assembly, the bores in the housing 10 are sealed off tightly on the outside by appropriate caps 36.

What is claimed is:

1. A torsional vibration damper for the crankshaft of an internal combustion engine, the damper comprising:

a housing;

a damper mass installed in the housing and embedded in a fluid; and a spring device arranged to connect the damper mass to the housing, the spring device having leaf springs, at least two of the leaf springs being connected at a first end to the housing and at a second end to the damper mass, the leaf springs being arranged so as to exert a restoring force on the damper mass both against a centrifugal force acting on the damper mass and against a deflection of the damper mass in a circumferential direction, so that the damper mass is prevented from striking the housing.

2. The torsional vibration damper according to claim 1, wherein the housing forms part of a counterweight and/or of a crank arm of one of the cranks of the crankshaft.

3. The torsional vibration damper according to claim 1, wherein the damper mass is formed as a single part.

4. The torsional vibration damper according to claim 1, wherein the damper mass has a groove for each of the leaf springs, into which groove a section of the leaf spring between the ends fits.

5. The torsional vibration damper according to claim 1, wherein each of the leaf springs has thickened, cylindrical areas at each end, which areas fit into corresponding cylindrical openings in the housing and in the damper mass.

* * * * *